Patented Dec. 1, 1931

1,834,405

UNITED STATES PATENT OFFICE

WILHO A. KOSKEN, OF NEW YORK, N. Y., ASSIGNOR TO WILHO A. KOSKEN, INC., A CORPORATION OF NEW YORK

AUTOMATIC MONITOR-SYSTEM

Application filed May 31, 1930. Serial No. 458,095.

This invention relates to means for preventing excessive volume of energy supply to a loud speaker in connection with sound systems controlled by light sensitive cells.

An object of the invention is automatically to monitor the energy supplied to a loud speaker by controlling the volume of the sound modulated light received by said cell.

In carrying out the general object of the invention, I propose to cause an electromagnetic device to be associated with the circuit for the loud speaker in such a way that an increasing current for the loud speaker causes a mechanical movement constrained to interpose a screen effect to shield the cell from light.

It is a further object of the invention to provide a graduated screen in which a controlling movement interposes a less transparent portion of the screen to check the light rays travelling to the cell.

The above and further objects of the invention will be pointed out more particularly in the accompanying claims which are directed to an illustrative embodiment of the invention solely for purposes of illustration and not limitation. This illustrative embodiment of the invention is shown in the diagrammatic figures of the accompanying drawings which form a part hereof and it is to this illustrative embodiment that the following specification is directed.

Figure 1:
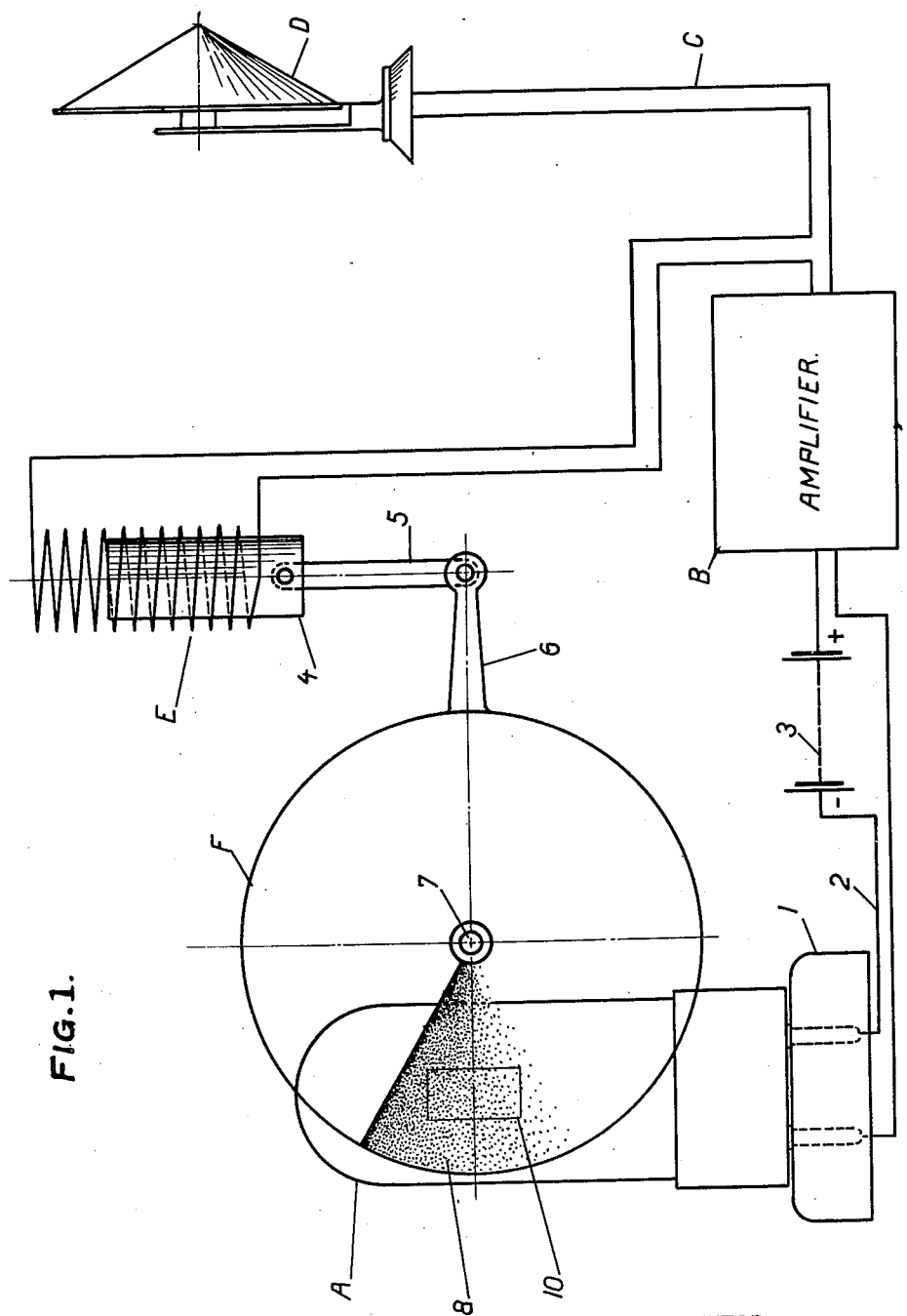
Figure 2:
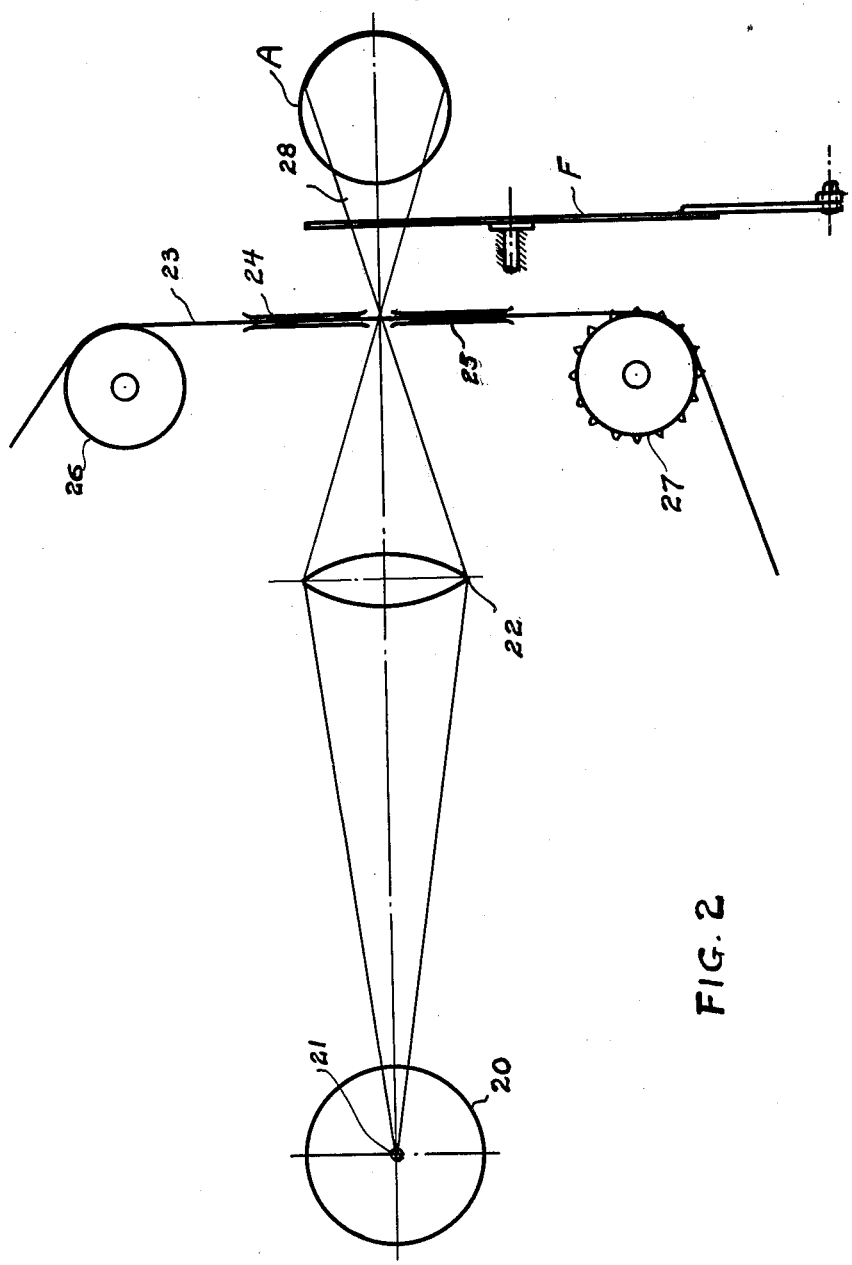

In the drawings, Fig. 1 is a diagrammatic illustration of the monitoring system; and Fig. 2 is a diagrammatic illustration of the sound modulated light system adapted to operate the light sensitive cell.

A light sensitive cell of any suitable type shown in the form of a photoelectric cell A is to be understood as mounted as a part of any complete mechanism such as a sound-on-film projector and is shown mounted in its socket 1 connected through circuit 2 including an activating battery 3 with an amplifier system B. The circuit C from the amplifier system B energizes the loud speaker D, but includes the electromagnetic device E shown in the form of a solenoid, the plunger 4 of which is connected by link 5 with a lever 6 on the rotating shield F which is pivoted upon a horizontal axis 7 and may be together with the arms 6 stamped from sheet metal. In its functioning part, a shield 8 is provided. This shield 8 may conveniently be formed of ground glass carrying a varying degree of opacity as by painting, stippling or staining with a light shielding material. The controlling movement from the solenoid E is such as to interpose varying degrees of opacity across the light entrance window 10 for the photoelectric cell A. For example, an increase in energy supplied to the loud speaker D causes the plunger 4 to be drawn upward and a greater light shielding effect to be interposed between the source of sound modulated light (not shown) and the light entrance window 10.

A diagrammatic illustration of a sound-on-film projector is indicated in Fig. 2 in which 20 is an exciter lamp, the image of the filament 21 of which is reduced and projected by the lens 22 upon the film 23 carrying the usual photographic sound record and guided and driven by any suitable mechanism such as the guides 24, 25 and the roller and sprocket 26 and 27. It is the beam 28 of sound modulated light in which the graduated shutter F is interposed to control the actual light volume reaching the cell A, the control being to monitor sound volume from the loud speaker D.

It is, of course, to be understood that the size of the light shield sector 8 may be varied and that the constantly limiting means such as the shield 8 may be varied in size and configuration and the window 10 need not be a window formed on the wall of the cell A as shown.

What I claim and desire to secure by United States Letters Patent is:

1. In an automatic monitor-system, a light sensitive cell adapted to respond to sound modulated light; means for variably shielding the quantity of said modulated light adapted to reach said cell; a loud speaker; an amplifier system controlled by said cell; a circuit from said amplifier to said loud speaker including an electromagnetic means for operating said means for shielding automatically in response to an increase of loud speaker energy delivered through said circuit.

2. In combination, a light sensitive cell adapted to receive sound modulated light impulses; an amplifier system controlled by said cell; a loud speaker; a circuit from said amplifier system to said loud speaker; electromagnetic means responsive to variations in current strength in said circuit; and means operated by said electromagnetic means for reducing the quantity of light reaching said cell upon an increase in the energy fed to said loud speaker.

3. In an automatic modulator, a loud speaker; an amplifier system; a light sensitive cell for controlling said amplifier; a circuit from said amplifier to said loud speaker; electromagnetic means responsive to current changes in said circuit and a shield operated by said electromagnetic means and functioning to vary the quantity of light reaching said cell.

4. In an automatic monitor system, a light sensitive cell adapted to receive sound modulated light; a loud speaker; an electrical system for operating said loud speaker under the control of said cell; and means for reducing the quantity of light reaching said cell upon an increase in the energy received by said loud speaker.

5. The method of monitoring loud speakers actuated from a light sensitive cell including reducing the quantity of light operatively reaching said cell in response to an increase in the energy for operating said loud speaker.

WILHO A. KOSKEN.